United States Patent
Todd

(10) Patent No.: US 7,461,068 B2
(45) Date of Patent: Dec. 2, 2008

(54) METHOD FOR RETURNING A DATA ITEM TO A REQUESTOR

(75) Inventor: Stephen James Todd, Winchester (GB)

(73) Assignee: International Business Machines Corporation, Armonk, NY (US)

( * ) Notice: Subject to any disclaimer, the term of this patent is extended or adjusted under 35 U.S.C. 154(b) by 456 days.

(21) Appl. No.: 10/863,947

(22) Filed: Jun. 8, 2004

(65) Prior Publication Data

US 2004/0264241 A1  Dec. 30, 2004

(30) Foreign Application Priority Data

Jun. 27, 2003  (GB)  ................................ 0315064.6

(51) Int. Cl.
G06F 7/00 (2006.01)
(52) U.S. Cl. ....................................................... 707/10
(58) Field of Classification Search ..................... 707/10
See application file for complete search history.

(56) References Cited

U.S. PATENT DOCUMENTS

| | | | | |
|---|---|---|---|---|
| 5,307,348 A * | 4/1994 | Buchholz et al. | ............ | 370/348 |
| 5,379,386 A * | 1/1995 | Swarts et al. | ................ | 710/310 |
| 5,983,225 A | 11/1999 | Anfindsen | | |
| 6,108,654 A | 8/2000 | Chan et al. | | |
| 6,363,387 B1 | 3/2002 | Ponnekanti | | |
| 2002/0143947 A1* | 10/2002 | Ishmael et al. | .............. | 709/226 |
| 2003/0105800 A1* | 6/2003 | Cullen | ......................... | 709/201 |
| 2003/0195866 A1* | 10/2003 | Long et al. | ..................... | 707/1 |

* cited by examiner

*Primary Examiner*—John Cottingham
*Assistant Examiner*—Nirav K Khakhar
(74) *Attorney, Agent, or Firm*—Janaki K. Davda; Konrad Raynes & Victor LLP

(57) ABSTRACT

A method for returning a data item to a requestor (where the requestor may, for example, be a systems application) including: receiving a request to access a data item having data contents of uncertain state (i.e. because the data item is pending completion of a transaction), obtaining the data item contents and an indication of the state (e.g. delete_on_commit) of the data item contents, and returning this information to the requestor.

5 Claims, 4 Drawing Sheets

METHOD FOR RETURNING A DATA ITEM TO A REQUESTOR

CROSS-REFERENCE TO RELATED FOREIGN APPLICATION

This application is a non-provisional application that claims priority from the commonly assigned United Kingdom Patent Application entitled "Apparatus for Returning a Data Item to a Requestor", having United Kingdom Patent Application Serial No. 0315064.6, filed on Jun. 27, 2003, by Stephen J. Todd, which application is incorporated herein by reference in its entirety.

FIELD OF THE INVENTION

Implementations of the invention relate to data processing.

BACKGROUND OF THE INVENTION

A transaction processing system typically includes one or more resource managers for coordinating the processing of data (e.g. one or more queue managers in a messaging system). There are certain times in the processing of such data that the data will be of uncertain status (state) (e.g. an update/insert/delete request may be pending completion of a unit of work such as a transaction (commit/abort)). Data of uncertain status is typically invisible to all transactions apart from the one from which the data was modified. However this is intentional since it is considered dangerous for other transactions to have access to data whose status has been modified but has not yet been finalized by the transaction.

One example of a problem that arises as a result of data being of uncertain status is "the lost message" problem. FIG. 1 shows a much simplified example of a typical messaging system (e.g. WEBSPHERE ® MQ available from IBM ® Corporation (WEBSPHERE AND IBM are trademarks of International Business Machines Corporation in the United States, other countries, or both). Application 10 puts messages to queue manager 1 for transmission, via queue managers 2 and 3, to application 20. At queue manager 1, each message is received and placed on a transmit queue (XQ) 30 for transmission to queue manager 2. Mover 95 removes each message from XQ 30 and transmits them across channel 90 to queue manager 2, where such messages again get forwarded by mover code to XQ 40 and finally onto XQ 50. At XQ 50 messages are removed for processing by application 20. By way of example, application 20 may use such messages to update a database 80.

Occasionally such messages may fail to reach their destination. In which case the putting application 10 might not receive (within an acceptable time period) an acknowledgment that its message has been properly delivered to application 20. Consequently application 10 may alert system management software (not shown) to the possibility that there is a problem. Such software will typically then scour the route that the lost message should have followed looking for it. The lost message could be in any number of places—e.g. a dead letter queue 70 on any one of queue managers 1, 2 or 3. Alternatively the message may be on an XQ in an uncertain status (this may, for example, be the case if a request is pending or if a channel 90 fails in the middle of a transmit operation). If the latter is true, the message will be invisible to the system management software—in which case, such software will not find the message.

Since such uncertain messages do not exist as far as the system management software is concerned, there is a danger that they may never be found. For example an administrator may take the decision not to restore a broker transmission channel but to begin transmitting messages via a different queue manager (e.g. queue manager 4)—in which case, a message with an uncertain status may never reach its destination.

In another example, an application may start a transaction with a transaction coordinator and "get" a message from a queue manager in order to update a database. In this example, the transaction coordinator is using two-phase commit protocol. The message is got by the application which then accordingly updates the database and requests the transaction to commit. Both resource managers involved (i.e.: the queue manager and the database manager) are then asked to "prepare". Once the queue manager has reached "prepared" state the message goes indoubt until the transaction is committed or backed out. If the transaction is committed the database update is finalized and the message is deleted from the queue, whereas if the transaction is backed out then the database update is aborted and the message remains on the queue. Before the message goes "indoubt", the message is inprocess and it is permissible (though not always desirable) for the transaction coordinator or either resource manager to unilaterally decide that the transaction must be backed out. However, both of the resource managers reach "prepared" state, both are under contract to complete the transaction, and cannot unilaterally decide to commit or back out independently from the transaction coordinator. The message is in an uncertain state both before and after going "indoubt"; but once it is "indoubt" it is impossible to resolve this uncertainty until the queue manager is directed to complete (commit or back out) by the transaction coordinator. However, in a transaction, between a given resource manager going "indoubt" and being directed to complete, all other resource managers involved in the transaction must be contacted by the transaction coordinator. As a result if the transaction involves many resource managers this can take a very long time. Whether the message is inprocess or indoubt, it is still uncertain, and there are still two potential 'final' states depending on the transaction outcome.

There are other problems involved in reading records in a database (whether or not a messaging system is being used). There are various options for handling the reading of locked records:

i) Wait until record is unlocked—this is the standard option used by databases;

ii) Dirty read—read the record even though it is locked. This is used by databases where 'low quality' information is adequate. (Not all databases use the same conventions for dirty read, for example some will show the result of an update by returning the value of a record prior to the update, and some will return the value of a record as it will be if the update is successful);

iii) Skip locked. Skip over the locked record as if were not there, and return the next appropriate record (if available).

These all have disadvantages: option i) can lock out an application for a long time, and cause unnecessary deadlocks. This option is nevertheless necessary where highest quality database data and strict ordering of records is required. Option iii) goes to the other extreme from dirty read—it gives the application no indication even of the existence of such records. Option ii) avoids deadlocks and does not "hide" records, but it may provide incorrect data without the application even being aware. Nevertheless option ii) it is a useful option which hitherto has been restricted in its use due to the aforementioned disadvantage.

SUMMARY

Accordingly the invention provides an apparatus for returning a data item to a requester, the apparatus comprising: means for receiving a request to access a data item, the data item contents being of uncertain state; means for obtaining the data item contents and an indication of the state (this may for e.g. be a state itself such as delete_on_commit, insert_on_commit or may be an indication from which such state can be inferred) of the data item contents; and means for returning the data item contents and associated state indication to the requester.

This is contrary to the systems described in U.S. Pat. Nos. 6,363,387, 6,108,654 and 5,983,225 since such systems police information about uncertain data internally to the resource manager (e.g. database manager). Such systems do not return information about uncertain data to requesters (including an indication of state).

The invention preferably provided the ability for a requester of uncertain data to be made aware of not only the existence of such data, but also the nature of the uncertainty.

Where the requestor is a system application such as a systems management program; or is itself really a system program but is making use of the services of lower level systems (e.g. a messaging system making use of a database system to persist messages), it is particularly useful to return data and associated state indication. Unlike typical user applications such system application programs are aware of the intricacies of transactions and potential outcomes. (They are not however aware of (and generally do not wish to become aware of) the internal implementation details of lower level systems.)

By making requesters aware of the information known to, for example, the involved resource manager, it is possible for such requesters to improve their decision making process.

Preferably it is determined whether the requester is authorized to receive the data item and status information prior to returning this.

The data item may be a message in a message system or may be a record in a database.

Preferably the state indication comprises a value which indicates whether or not the uncertain data contents will become certain upon a successful completion of the unit of work operating upon the data item. For example the indication may comprise a before version (image) corresponding to a version of the data record before the record entered uncertain state. From this it is preferably possible to infer the state of the uncertain data item. For example if the before version is null, then the state is typically insert_on_commit. Likewise, if the before version exists but the returned data item is null, then the state is typically delete_on_commit.

Preferably the indication of state further indicates whether the data item is inprocess or indoubt.

According to another aspect, the invention provides a method for returning a data item to a requester, the method comprising the steps of: receiving a request to access a data item, the data item contents being of uncertain state; obtaining the data item contents and an indication of the state of the data item contents; and returning the data item and associated state indication to the requester.

It will be appreciated that the invention may be implemented as a computer program comprising program code adapted to perform the above method when the program is run on a computer.

According to another aspect, the invention provides a system for returning a data item to a requestor, the system comprising: a database comprising records; and a database manager comprising: means for receiving a request to access a data item represented as a data record in the database, the data record contents being of uncertain state; means for obtaining the contents of the data record and an indication of state of the data item contents; and means for returning the data record contents and indication of state to the requestor.

The system in one embodiment further comprises messaging means having a queue for holding messages and the database comprises means for persisting messages on the queue as database records. Preferably the means for receiving a request to access a data item is operable to receive such a request from the messaging means subsequent to failure of the messaging means, the requested data item being requested in order to recover the queue. Preferably the messaging means comprises means for using the returned data item and state indication to recover the queue.

The system in another embodiment comprises messaging means comprising a queue for holding messages and the database comprises means for persisting messages on the queue as database records. In this embodiment the messaging means further comprises means for receiving a request to access a message subsequent to failure of the messaging means, the copy of the message persisted to the database being of uncertain state; means for requesting the copy of the message and associated state indication from the database; means for receiving the copy of the message and associated state indication from the database; and means for returning the copy of the message and associated state indication to the requester.

According to another aspect, the invention provides a messaging system for returning a message to a requester, the messaging system comprising: at least one queue for receiving messages; and a queue manager, the queue manager comprising: means for receiving a request to access a message, the message contents being of uncertain state; means for obtaining the message and an indication of the state of the message; and means for returning the message and associated state indication to the requester.

BRIEF DESCRIPTION OF THE DRAWINGS

Embodiments of the present invention will now be described, by way of example only, and with reference to the following drawings.

DETAILED DESCRIPTION

Figure 2A:
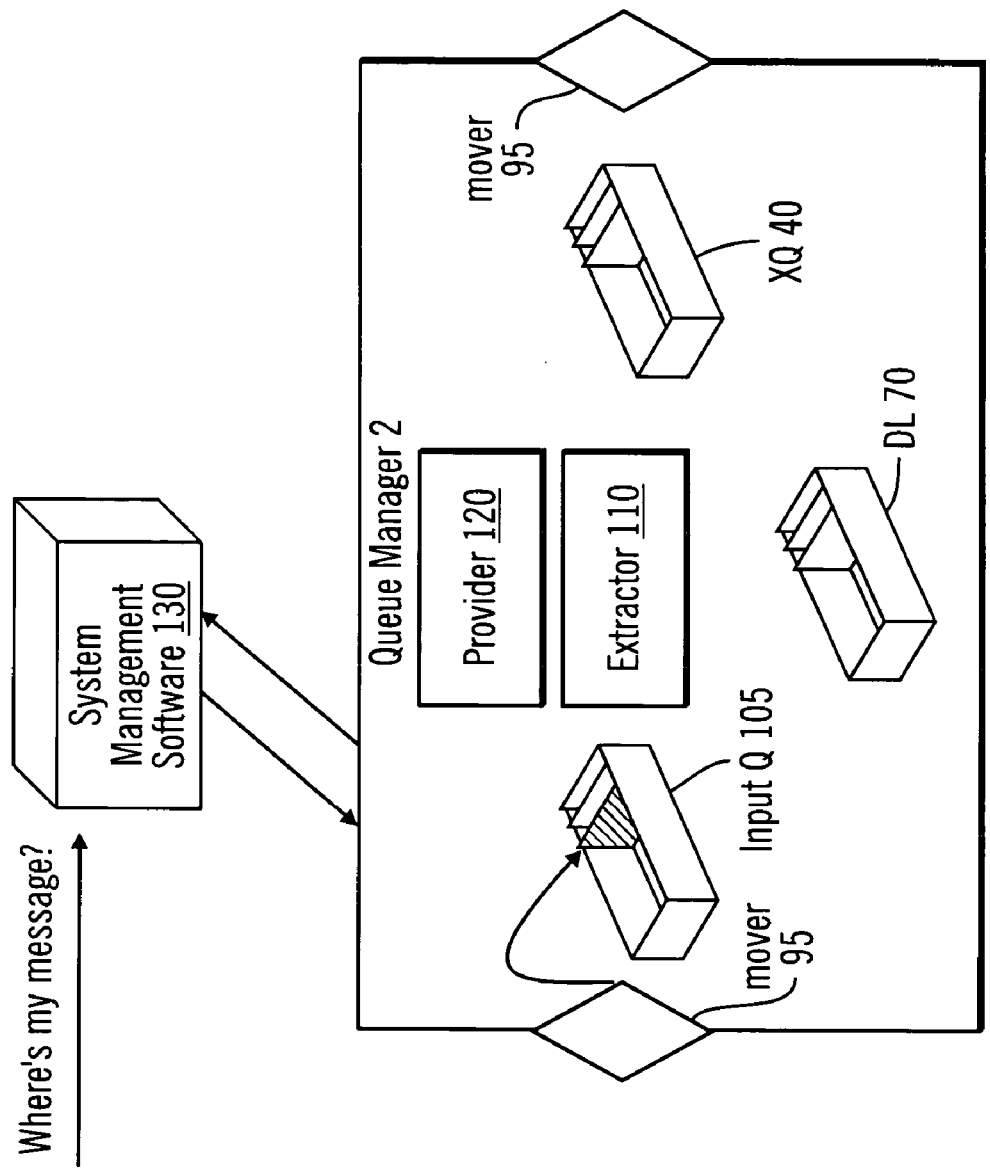
FIGS. 2a and 2b illustrate one embodiment of the present invention.
Figure 2B:
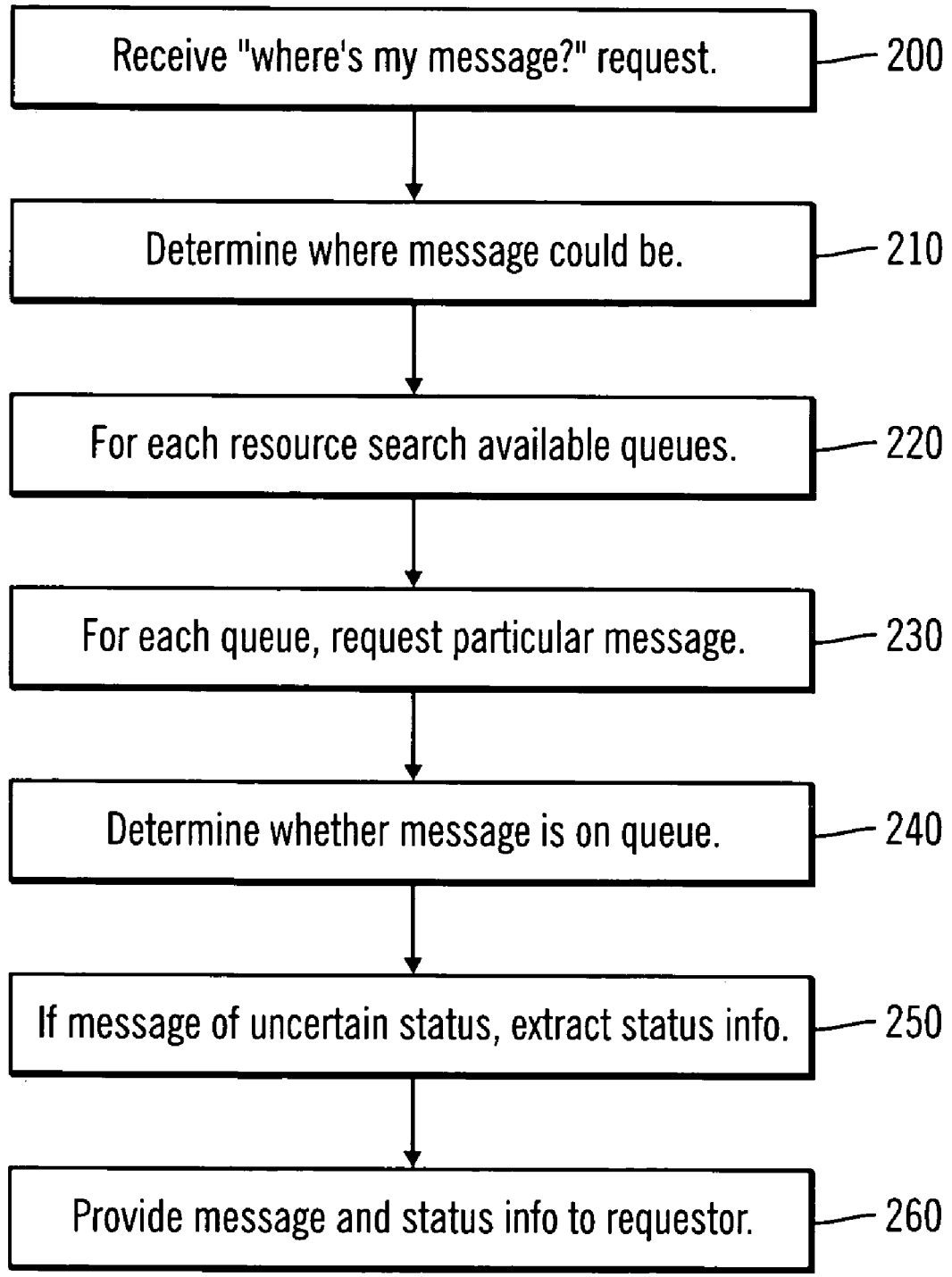

With reference to FIGS. 2a and 2b, system management software 130 receives a "where is my message?" request from an application (step 200). The request includes the id of the message being sought.

In this example the "lost" message is sitting on an input queue (Q) 105 on queue manager 2. It was placed there by mover code 95, but before this operation could complete, the communications channel failed. Thus as far as the messaging system is concerned, the status of the message is uncertain since the message may commit or backout—in other words, the message is invisible to all but the queue manager.

The system management software, first determines all possible places that the message could be (step 210). In other words, the queue manager determines the route that the message should have take to reach its destination. The software can determine this from configuration information that it has access to.

Having determined which queue managers the message should have passed through, the system management software searches the queues of each one in turn (step 220). In this example software 130 may search input Q 105, XQ 40 and DL 70.

For each queue, the software asks the queue manager (using the id of the message), whether the message exists on that queue (step 230). The queue manager is able to see all messages on a queue, irrespective of whether a message is of uncertain status. Normally however, the queue manager keeps "uncertain" messages hidden. The general policy, in accordance with the prior art, is that it is dangerous to provide applications with "uncertain" messages since an "uncertain" message may for example subsequently be backed out. The present invention preferably however provides that "uncertain" messages are no longer hidden from certain types of application—for example system management software.

The queue manager thus determines whether the specified message is on the queue in question (e.g. input Q 105) at step 240. If the message is not there then a status of not_available is returned and if the message is not of uncertain status then an unlocked status will be returned. If the queue manager determines that the message is on the queue, but that its status is uncertain, extractor component 110 extracts information about the message (step 250). Such information is then passed to provider component 120 which provides the message (if available) and status information associated therewith to system management software 130 at step 260. In the preferred embodiment, the status may be one of:

i) delete_on_commit—i.e. if the transaction commits then the message will be deleted from the queue; and
 ii) insert_on_commit—i.e. if the transaction commits then the message will be inserted into the queue.

The provider component 120 also provides the id of the transaction waiting to commit under which the message was put (null for an unlocked or unavailable message).

Figure 1:
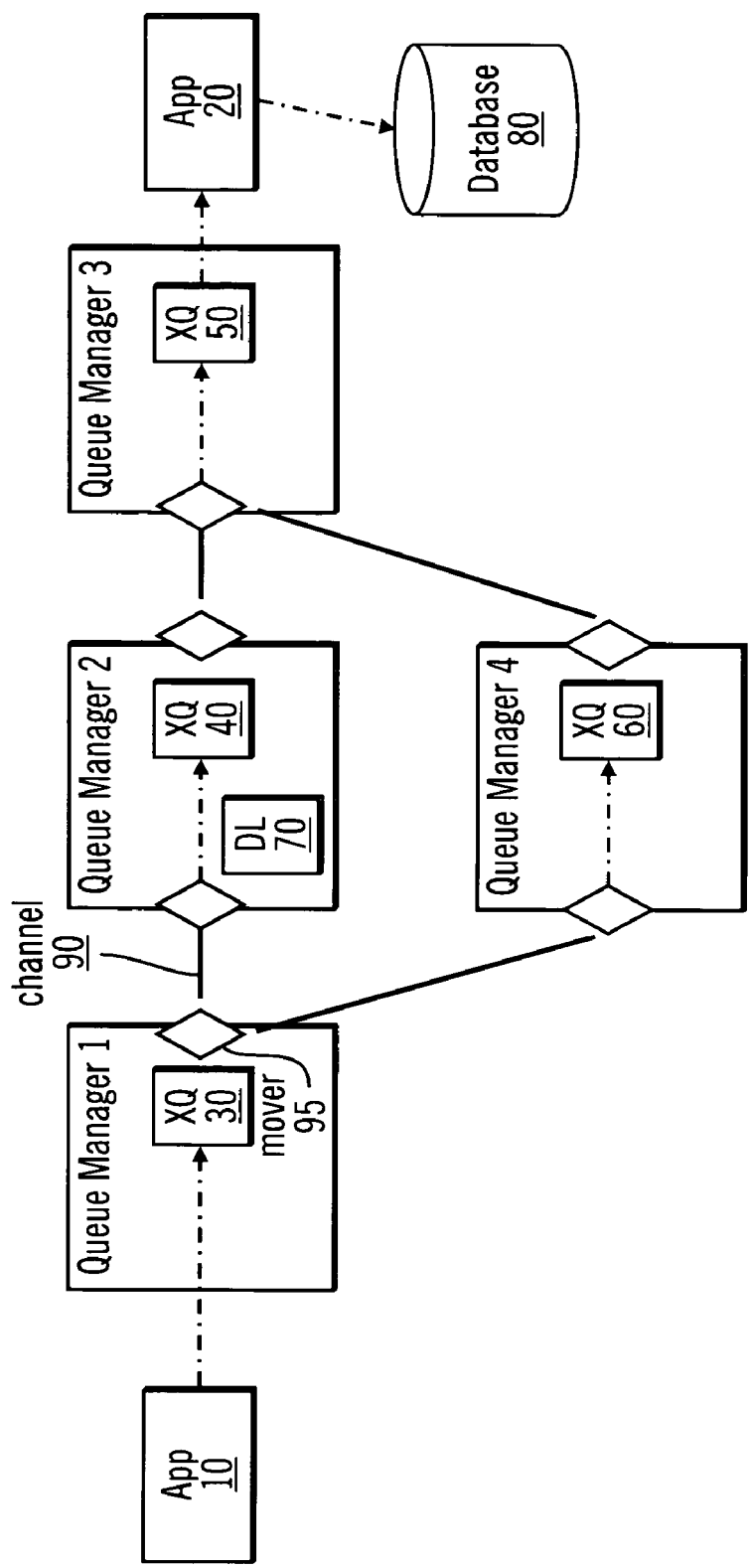
FIG. 1 shows an overview of a messaging system in accordance with the prior art.

Note the status of inprocess and indoubt (as described above) apply to both delete_on_commit and insert_on_commit. Thus the status information may further indicate to the system management software whether the uncertain message is inprocess or indoubt. This information is of value to the system management software as it gives the system management software more information about strategies that may be undertaken to 'free' the message. If the message is inprocess, the systems management software may communicate with the resource manager to force the transaction to back out. This will free the message from its uncertainty, and it may then (for example) be flowed over another channel. For example in FIG. 1 the message is now free to flow to Queue Manager 4 if Queue Manager 2 (or channel 90) is unavailable. However, if the message is indoubt no such forced backout may be taken, as the resource manager is already under contract to the transaction coordinator. Thus the transaction management software will know that the alternate routing strategy is not available.

Note, in the preferred embodiment the queue manager first determines whether the software searching the queue is authorized to see "uncertain" messages. Status information regarding such "uncertain" messages is preferably only provided if the requester (e.g. system management software 130) is authorized. Other applications programs will run exactly as with the prior art.

Further, whilst the provision of such status information has been described in the context of searching for lost messages, this is by no means the only reason for the provision of such information.

Status information may also be provided in a database system. In such a system a database manager would typically keep those database records with an uncertain status hidden. The present invention, in accordance with a preferred embodiment, provides that such records are no longer hidden to certain applications.

For such applications status information is returned for uncertain records. The database manager preferably uses an extractor component and a provider component to achieve this (just as in the messaging embodiment described above). A read of such a record will preferably return each of the following:

i) a before image (null if no record there before another incomplete transaction inserted the record);
 ii) an after image (null if another incomplete transaction has deleted the record)
 iii) a status—e.g. UPDATE_ON_COMMIT, DELETE_ON_COMMIT, INSERT_ON_COMMIT
 iv) a transaction id (null for an unlocked or unavailable record).

Note, it is possible to infer the status from the before and after images and as a result the status is optional.

Note, if the record does not exist, then NOT_AVAILABLE will be returned. Further if the record is not of uncertain status, then an UNLOCKED status will be returned—in which case only one image will be returned (i.e. the record contents).

In extreme cases; for example where field locking is used and very high update parallelism, a record may have more than one outstanding update pending at once. For example, a person record may have a transaction updating the salary, and another updating the address. There are then four potential outcomes, as each of these updating transaction may independently commit or backout. It can be seen that an interface could be designed to show all potential outcomes in such circumstances. It is unlikely that the complication of implementation, the confusion of handling such results at the system application program, and the rarity of such events occurring, would justify such an extension of the two-outcome system described above. It is probably most appropriate to return a before image that will be valid if all transactions back out, and an after image that will be appropriate if all transactions fail.

By providing the information listed at i, ii, and iii above, the application receiving such information can make a determination as to which type of information is most appropriate for the application's current need. With prior art databases, the information provided is preconfigured. For example, some database systems process records optimistically by always assuming that the data is correct, even though the record may be locked. Now, it is possible for the application to make a decision as to the most likely end value of a record. If one takes an "update_on_commit" example, the application may decide that it is not interested in the updated value of the record. For example, an application may be gathering statistical information on employees with a salary of more than £100,000. Status information might show that before a particular record was updated their salary was £105,000 and that if the record is updated, their salary will be £110,000. In other words, it makes no difference to the application whether the current or the updated version of the record is read—the result will still be the same. Thus the application may choose (on the basis of the status information returned) not to wait for the update to complete, but to use the current value.

Note, a messaging system may be used in conjunction with a database system. In accordance with one embodiment, messages are persisted to a database store and are operated on from an in-memory cache above the database. In the event of, for example a queue manager failure, any messages that were on a queue (represented by the in-memory cache) at the time of the failure can be recovered from the database.

If at the time of failure of the in-memory cache, a record in the database is of uncertain status (e.g. an update has not finally been committed), it would previously have been difficult to recover accurately the in-memory cache on restart until this uncertainty is resolved.

i) If strict 'wait till unlocked' access to the database is used on restart, the restart process will block until resolution of the uncertainty;
ii) If dirty read is used for restart, the cache will see messages as 'available' when they are in fact of uncertain status;
iii) If skip locked read is used for restart, the cache will not see the uncertain messages, and will not be able to offer strict message ordering to applications.

With the status information provided by the present invention, it is possible for a queue manager which is implemented on top of the database to know the uncertain status of messages and therefore to react correctly to requests from system applications and transaction coordinators.

Figure 3:
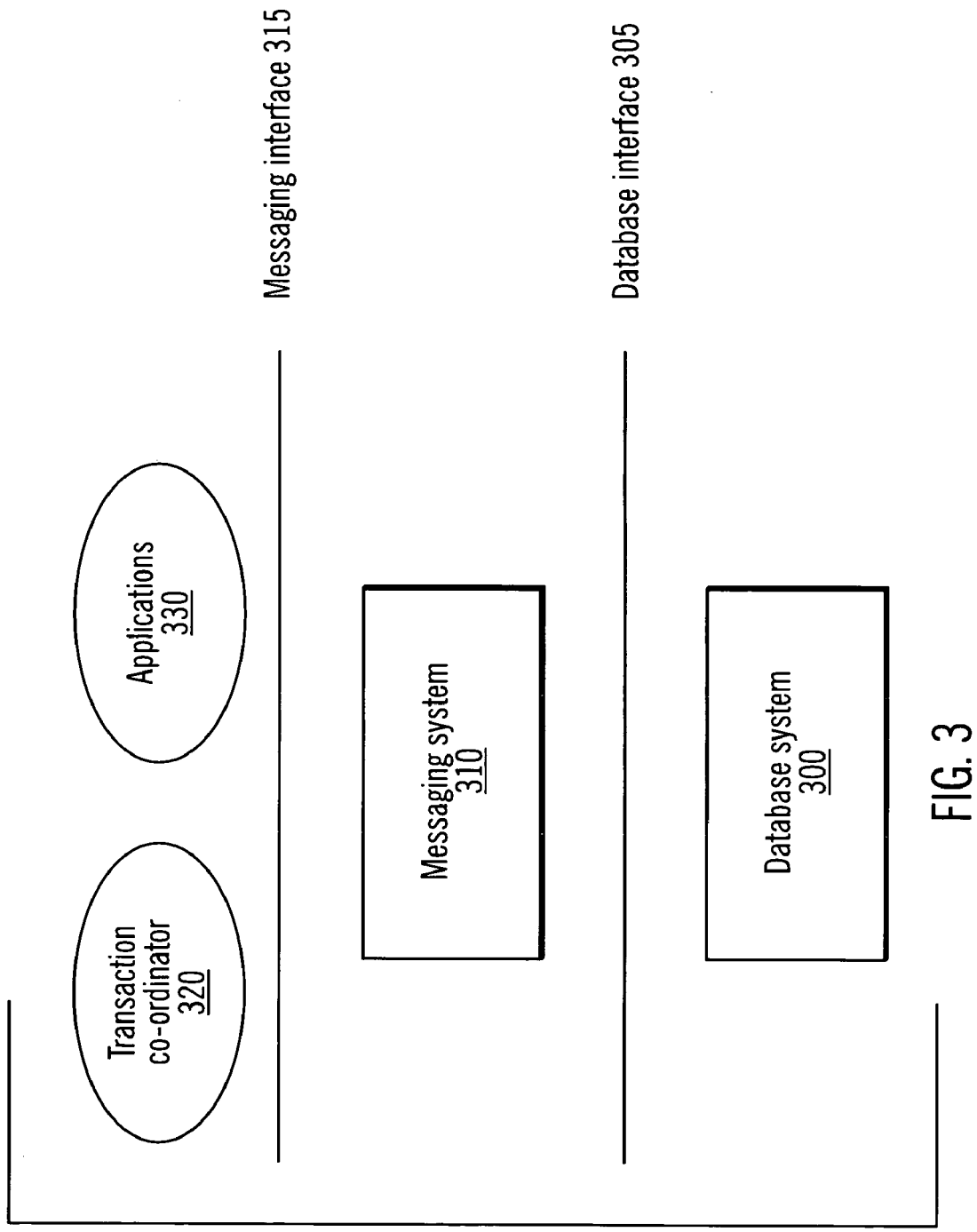
FIG. 3 illustrates an embodiment in which a messaging system and a database system are used in conjunction with one another.

FIG. 3 shows an implementation according to a preferred embodiment. Messaging system 310 communicates through database interface 305 with database system 300. Transaction coordinators (one shown 320) and system applications 330 communicate through messaging interface 315 with messaging system 310. A queue in the messaging system may fail whilst messages being persisted from the queue to a database in the database system are of uncertain status (e.g. indoubt). Previously, according to the prior art, the messaging system would have been unaware of any uncertain records. Thus upon restart, such records may not be recovered onto a failed queue. Alternatively they may, but without an indication of status—i.e. such a recovered message would be assumed to have been committed. Now, according to an embodiment of the present invention, it is possible to recover even uncertain messages to the failed queue and to recover them in their correct status. Further the messaging system may pass such status information onto authorized requesters (e.g. systems applications).

The provision of status information in, for example, a messaging system; database system; or hybrid, enables a system's application/indirectly involved resource manager (e.g. the messaging system of FIG. 3) to be aware of data of uncertain status and to be able to make an informed decision as to how to process such data. The status information is extracted and provided to authorized requesters and may, for example may be provided in order to determine the implications of forcing unresolved transactions (e.g. in the event of database system failure). Previously a system's administrator would typically have had to make a guess as to the correct state of the system and which was difficult since they would not have been aware of pending updates, deletes etc. Now the system's administrator is made aware of pending requests and their status. Whilst an incorrect guess may be made (e.g. an update may not commit as expected), it is far more likely that the system data will be correct.

What is claimed is:

1. A method for returning a data item to a requestor, the method comprising the steps of:

receiving a request from an application that asks where a data item is and that provides an identifier of the data item;

determining a route that should have been taken by the data item using configuration information, wherein the route includes one or more queue managers;

for each of the one or more queue managers included in the determined route, asking that queue manager whether the data item exists on a queue managed by the queue manager; and under the control of each of the queue managers, receiving a request to access the data item from the requestor, the data item having data item contents being of uncertain state, wherein an identifier of the data item is provided by the requestor, wherein the data item has data item contents being of uncertain state when the request is pending completion of a unit of work with a commit or an abort; and in response to the requestor comprising system management software, and, in response to determining that the data item is on the queue managed by the queue manager, obtaining the data item contents and an indication of the state of the data item contents; and returning the data item and associated indication of the state to the requestor, wherein the indication of state includes at least one of delete_on_commit and insert_on_commit, wherein delete_on_commit indicates that the data item is deleted from the queue when a transaction commits and wherein insert_on_commit indicates that the data item is inserted into the queue when the transaction commits; and wherein the indication of state indicates whether the data item is in process or indoubt, wherein the data item goes indoubt when the queue manager has reached a prepared state until the transaction is one of committed and backed out, wherein the data item is in process before the data item is indoubt, and wherein, when the data item is inprocess, the system management software is capable of communicating with a resource manager to force the transaction to back out.

2. The method of claim 1 wherein the data item is a message in a messaging system.

3. The method of claim 1, wherein the data item is a record in a database.

4. The method of claim 1, wherein the indication of the state comprises a value which indicates whether or not the uncertain data contents will become certain upon a successful completion of the unit of work operating on the data item.

5. The method of claim 1, wherein returning an indication of state comprises returning a before version image, the before version image corresponding to a version of the data item before the data item entered uncertain state.

* * * * *